April 16, 1963  F. ROSENBAUM  3,085,294
METHOD OF SECURING A RUBBER SOLE TO A SHOE UPPER
Filed March 8, 1960

INVENTOR.
Felix Rosenbaum
BY
Clayton L. Jenks
ATTORNEY 3,085,294
METHOD OF SECURING A RUBBER SOLE TO
A SHOE UPPER
Felix Rosenbaum, Leominster, Mass., assignor to Comfort Slipper Corporation, Fitchburg, Mass., a corporation of Massachusetts
Filed Mar. 8, 1960, Ser. No. 13,579
3 Claims. (Cl. 18—59)

This invention relates to the manufacture of shoes and more particularly to the method of securing an upper to a rubber sole.

A shoe may comprise an upper of leather, fabric, plastic, or other suitable substance secured to a sole made of a vulcanizable rubber compound; and the two parts are fastened together by heat and pressure which causes a lower inturned marginal rim of the upper to become embedded in the mastic of the rubber sole during vulcanization of the latter. Various problems have been presented in accomplishing a satisfactory adhesion of the rubber sole to the upper. If the two parts are cold when placed in a vulcanizing mold and the rubber is there heated to a vulcanizing temperature with the upper contiguous thereto, it is found that too much time is wastefully consumed in bringing the rubber up to a vulcanizing temperature, with the result that the vulcanization may not be uniform throughout and the two parts may not be adequately joined. Also, the required long heat treatment of the upper, if leather, tends to make it hard and brittle or otherwise detrimentally affected.

The object of the present invention is to provide a method of securing the upper to the rubber sole of a shoe whereby the vulcanizable rubber compound is preconditioned by heat before the molding and vulcanization stage but without any material surface vulcanization of the rubber, so that the lower rim of the upper may be readily embedded in the vulcanizable compound and the two adequately joined permanently by a vulcanizing heat and pressure. Other objects will be apparent in the following disclosure.

Referring to the drawings which show the sequence of operations involved in making a shoe:

Figure 3:
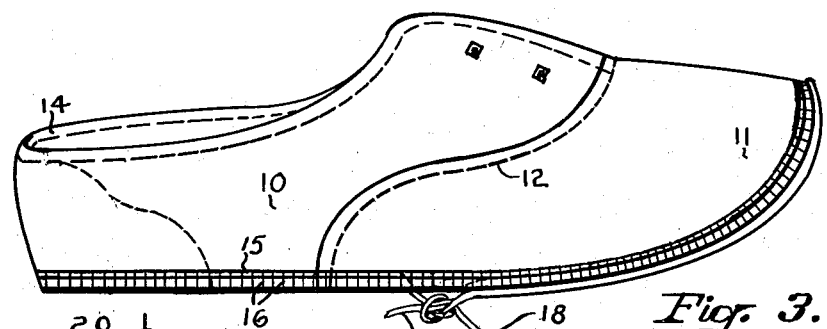
FIG. 3 is an elevation of a leather upper having attaching strings arranged for bending the toe and margined rim into final shape and securing the upper on a heated mold.
Figure 5:
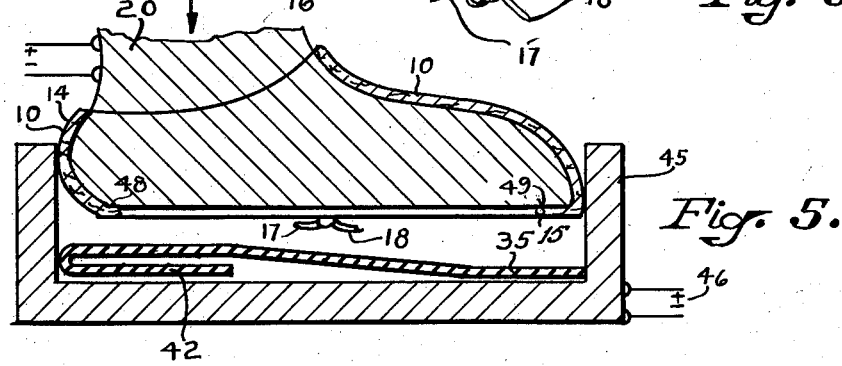
FIG. 5 is a diagrammatic view of the essential portions of the vulcanizing apparatus comprising a hollow heated mold within which the upper and the sole are to be joined and wherein the upper is secured in final shape on a heated shoe form.
Figure 4:
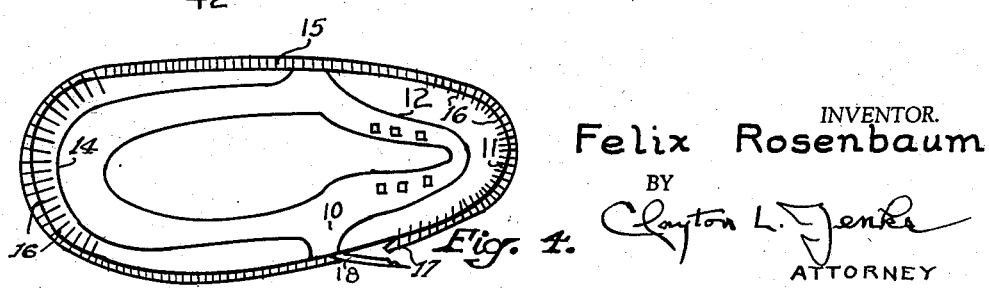
FIG. 4 is a top plan view of the upper prior to assembly on the heated shoe form.

The term "shoe" as used herein includes the standard form of shoe, a slipper, a sneaker or other type of foot wear. Referring first to FIGS. 3 and 4, the shoe upper 10 may be suitably shaped as shown of pieces of suitable material, such as leather, stitched or shaped to provide a toe portion 11. The upper is preferably initially shaped as a substantially flat piece (FIG. 4) which is secured by suitable stitching 12 to an upstanding heel portion 14. A single drawstring 15 of strong cord is secured as by means of loose stitching 16 substantially inside or along the lower edge of the upper. This string makes a complete turn around the edge and the two ends 17 and 18 are passed a second time around the toe portion and project from one side of the upper, as indicated. When the upper has been placed on the heated metal shoe form 20, the strings are drawn through their loose lacing and serve to pull the toe portion of the upper into the normal toe shape of a shoe and to form a bottom inturned lasting margin, as indicated in FIG. 5. After the upper has been drawn into shape, the string ends 17 and 18 are tied together, the knot being indicated in FIG. 3 in a loose condition before tightening, and the major portion of the loose ends of the strings are cut away. The knot and the ends of the string later become embedded in the rubber sole and thus are firmly held in place and the toe shape which has been formed by tightening the string remains permanent.

The composition of the rubber sole is a suitable vulcanizable mixture of rubber, sulphur, a vulcanization agent, a filler, or other ingredients, as may be desired, which is capable of being rendered soft by the application of heat and then converted by vulcanization to a condition satisfactory for use as a sole. I have found that it is desirable to pre-heat this rubber sole to a non-vulcanized but nearly plastic condition prior to assembling it with the upper, both to save time in the vulcanization stage and to make a stronger and better product. Care has to be taken, if the rubber is to be pre-heated by means of an infra-red electric bulb or other heat concentrating device, to avoid the danger that before it can be united with the upper, the rubber will have been initially vulcanized or case hardened, as it were, which renders it difficult to secure a satisfactory union with the upper.

In accordance with my invention, I find that the rubber sole may be effectively heated internally as well as externally to a reasonably uniform nearly plastic condition by means of an electric resistor which is extensive in area and as large as the sole and thus provides a uniform radiation of heat energy substantially normal or perpendicular to the entire surface area of each side of the sole, so as to heat all of the rubber compound substantially uniformly. Hence, I arrange a resistor element on each side of the sole. Such a resistor is preferably a radiant heating element mounted on a tempered glass plate 25. This may be made by coating the upper surface of the plate with a bonded electrically conducting resistance element film 26 of suitable composition to give the desired electrical resistance and heat capacity. Back of this resistance film, and preferably insulated therefrom, as by an air space, is a backing plate 27, such as aluminized steel or other heat reflecting material capable of reflecting heat waves back to the film and thence through the glass plate. The plates of this heating unit are made alike and they are mounted with the glass plates facing the work. The resistor glass plate and the metal backing are preferably held together by and mounted in an aluminum or aluminized steel frame 28 of suitable construction. Two asbestos covered nickel wires 30 and 31 are suitably connected with the opposite edge portions of each resistor element 26. The wires 30 and 31 may be connected to the metal strip 26 (shown exaggerated in thickness) by means of spring loaded carbon contacts engaging silver bands bonded to the conductive film or otherwise as found suitable. To prevent leakage of current, this resistor film does not extend to the ends of the plates. If desired, the glass may be held in place by the spring loaded carbon contacts on one side and by asbestos cushions on the other side at the edges so as to protect the glass from breakage. Various suitable or standard constructions may be employed for this heater which has been illustrated only diagrammatically. I preferably employ a radiant heater substantially as large as or larger than the sole being heated, so as to provide heat waves normal to the sole surface and produce a fairly uniform heat distribution.

Figure 1:
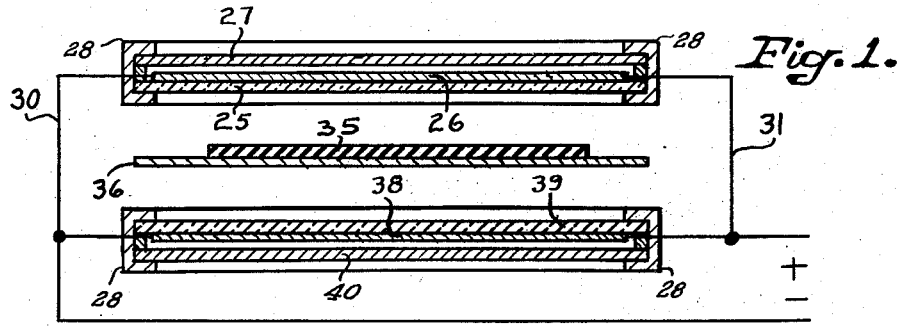
FIG. 1 is a diagrammatic view of apparatus, with the resistance element exaggerated, for pre-heating a vulcanizable rubber sole prior to assembly with the upper.

As indicated in FIG. 1, the sole 35 of a suitable vulcanizable rubber and sulphur composition is placed on a support 36, preferably formed as a grid with large spaces therethrough so as not to hinder the application of heat materially. This grid 36 is suitably supported so that the rubber sole 35 is held between the upper heating element 26 and a lower radiant heating element 38. The lower heating resistance element 38 and its glass plate 39 and metal backing 40 are constructed as above described, but with the glass plate facing the sole. The radiant plates are suitably spaced, such as 3 or 4 inches from the top and bottom faces of the sole, to give a proper heat treatment of the rubber composition. The two heating elements 26 and 38 are connected in parallel, as illustrated, and a suitable current and voltage is applied thereto. For example, the current may be a single phase 220 volt alternating current providing a wattage consumption of 2500 watts.

It is found that the surface temperature of the radiant heaters as indicated by a thermometer is about 350 to 400° F. and that the rubber is heated thereby to a suitable near-or semi-plastic condition below a vulcanization temperature in about 1½ minutes or so. That is, the temperature of each resistor is coordinated with the relative areas of the sole and resistor and their spacing and the duration of heat treatment of the sole to render the latter so nearly plastic that it may be vulcanized by a normal vulcanizing treatment in not over 2 minutes. This time element gives the workman ample time for removing a previously cured upper and sole from the mold and then placing the new parts in position without over exertion or waste of time.

Figure 2:
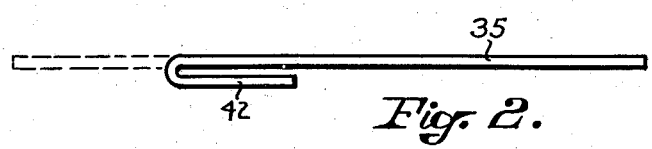
FIG. 2 is an elevation of the rubber sole with the heel portion bent over from the dotted line position for the final vulcanizing stage.

As above explained, the upper 10 is tied in position around the shoe shaped mold 20 by means of the drawstring 15. The rubber sole 35 may be made over size and have one end 42 bent into position, as shown in FIG. 2, as may be done after the sole has been pre-heated. The sole is then quickly placed while hot in the mold with the turned over portion 42 either in an upper or a lower position, as desired. The mold, which may be of standard construction as used in the shoe industry, comprises an electrically heated metal body 45 (FIG. 5) having a suitable resistor therein to which current is conducted by the terminal wires 46. Likewise, the shoe form 20 is electrically heated by a resistance element to a suitable molding temperature. After the parts have been assembled with the rubber sole in the bottom of the hollow mold body 45, and after the upper has been mounted on the shoe form 20, the latter is moved downwardly into the mold body under a suitable hydraulic or air pressure, such as 70 lbs. per sq. in., to force the upper 10 tightly against the pre-heated sole 35. The mold and shoe form are continually heated to the required molding and vulcanization temperature. For the vulcanization procedure, that temperature may be from 300 to 310° F. or otherwise as found desirable. As is evident from inspection of FIG. 5, the bottom welt formed by inturning the bottom lasting margins 48 and 49 of the upper will become embedded in the softened mastic of the rubber sole 35 under the influence of heat and pressure, and the entire string 15 and its ends 17 and 18 will be embedded in and make a strong union with the rubber mastic. Various procedures well known to the rubber vulcanization and shoe making industries may be adopted to satisfy the requirements of this invention.

The rubber compound employed is diathermous or permeable to radiant heat and because of the extensive radiation and lack of concentration of heat waves at any one locality, the heat penetrates rapidly into and throughout the rubber compound when placed on the grid 36 (FIG. 1), so that the rubber becomes preheated internally and is softened, but the heat condition is below that of the vulcanization temperature or low enough to prevent any material degree of vulcanization at the surface of the rubber prior to its junction with the upper in the final stage. The rubber is pre-heated to a temperature slightly below that of vulcanization, but the radiant plates may be maintained at a higher temperature to insure rapid action. Consequently, the rubber is pre-softened or conditioned by the radiant heat so that it quickly softens to a moldable plastic condition almost as soon as it is subjected to the final vulcanization temperature. Hence it makes a very quick union with the inturned edge or welt of the upper before vulcanization sets in to any material extent in the mold body. A suitable coordination of the temperatures of the radiant plates and of the mold bodies insures a satisfactory junction of the upper and the sole. In other words, the rubber is pre-heated to a point at which it is almost soft and in that condition where the softening is completed quickly in the mold and the lasting margin will become quickly and fully embedded, as required, in the mastic before vulcanization can take place to any large extent. Hence, the preheating of the sole by a wide spread and non-concentrated radiant heat insures a very firm union of the upper and the sole before the latter can become vulcanized into a substantially hard condition. This results in the curing of the rubber taking place in about 1½ minutes as compared with 4 minutes, if the rubber sole is not pre-heated. If the rubber sole is not preheated, then the longer time of vulcanization heat treatment makes the leather of the upper more hard and brittle, or otherwise affects it detrimentally, and the vulcanization action is less uniform throughout the sole.

Various other advantages will be apparent to one skilled in the art. Also, it is to be understood that many modifications may be made in the apparatus and procedure and that the above disclosure is to be interpreted as setting forth the principles of the invention and a preferred embodiment and method and not as imposing limitations on the appended claims.

I claim:

1. In the manufacture of a shoe, the method of attaching a sole to an upper comprising the steps of providing a sole of a vulcanizable rubber compound and an upper having an inturned lasting margin at its bottom edge portion, subjecting the opposite sides of the sole to radiant heat prior to assembly with the upper and rapidly pre-heating the sole substantially uniformly to a temperature below that of material vulcanization of the compound but sufficiently high so that it quickly becomes plastic and is vulcanized within two minutes when heated with the upper to vulcanize the compound, quickly applying the pre-heated sole to the lasting margin of the upper and without delay heating the sole and margin while subjecting the two parts for a period of not over two minutes to a vulcanization temperature and pressure which initially plasticizes the compound and embeds the lasting margin therein and then vulcanizes the compound in an intimately molded contact with the margin.

2. In the manufacture of a shoe, the method of attaching a sole to an upper comprising the steps of providing a sole of a vulcanizable rubber compound and an upper having a drawstring secured along its lower edge which is arranged for forming an inturned margin, preheating an interfitting last and mold to a vulcanization temperature, applying the upper to the preheated last and drawing up the string to shape the upper thereon and form the inturned margin, with portions of the drawstring exposed preheating the sole remote from the upper by applying radiant heat substantially normal to the upper and lower faces of the sole and rapidly raising its temperature to a point below that of material vulcanization of the compound but sufficiently high so that it quickly becomes plastic and vulcanizes within two minutes when heated with the upper to vulcanize the compound, quickly transferring the sole to the last mold, applying the upper against the sole while the latter remains pre-heated to a nearly plastic condition and thereby raising the temperature of the sole and completes its vulcanization within two minutes while it remains in contact with the upper, and simultaneously applying pressure to embed the margin and the exposed drawstring in the sole as the latter becomes fully plastic and vulvanization is completed.

3. The method of claim 2 in which the sole is preheated by radiant heat emanating from resistors on opposite sides of the sole each of which is larger in heating surface area than the adjacent surfaces of the sole and wherein the temperatures of the resistors are coordinated with the duration of the heating stage to render the sole fully plastic and vulcanizable in situ in not over two minutes.

References Cited in the file of this patent

UNITED STATES PATENTS

| | | |
|---|---|---|
| 1,164,860 | Piper | Dec. 21, 1915 |
| 2,032,471 | Conant | Mar. 3, 1936 |
| 2,289,524 | Smith et al. | July 14, 1942 |
| 2,445,701 | Vogt | July 20, 1948 |
| 2,512,364 | Moxness | July 20, 1950 |
| 2,529,830 | Bierer | Nov. 14, 1950 |
| 2,878,523 | Hardy | Mar. 24, 1959 |
| 3,002,230 | Stewart | Oct. 3, 1961 |

FOREIGN PATENTS

| | | |
|---|---|---|
| 826,379 | Great Britain | Jan. 6, 1960 |